United States Patent [19]

Dickerson

[11] Patent Number: 5,072,993
[45] Date of Patent: Dec. 17, 1991

[54] SELF-CONTAINED SHIM PACK ASSEMBLY
[75] Inventor: John M. Dickerson, East Peoria, Ill.
[73] Assignee: Caterpillar Inc., Peoria, Ill.
[21] Appl. No.: 632,680
[22] Filed: Dec. 24, 1990
[51] Int. Cl.[5] .................... F16C 33/00; F16B 43/00
[52] U.S. Cl. .................................. 299/37; 384/626; 411/536; 411/546
[58] Field of Search .................... 299/37; 384/626; 411/535, 536, 539, 546; 403/365

[56] References Cited

U.S. PATENT DOCUMENTS

| | | | |
|---|---|---|---|
| 4,679,857 | 7/1987 | Roussin et al. | 299/37 |
| 4,848,939 | 7/1989 | Ludwig | 384/626 |
| 4,909,692 | 3/1990 | Hendren | 411/546 X |
| 5,027,024 | 6/1991 | Slayton | 384/626 X |

Primary Examiner—David J. Bagnell
Attorney, Agent, or Firm—Calvin E. Glastetter

[57] ABSTRACT

Shim pack assemblies are useful for adjusting an dpositioning a guide relative to a moveable member. When adjustment is needed, shim plates are added or removed to move the guide relative to the member. The subject self-contained shim pack assembly includes a plunger positioned within a housing and extending toward a moveable member. A first plurlaity of shim plates within the housing is positioned on one side of the plunger. A second plurality of shim plates is positioned on the other side of the plunger. When adjustment is needed, a shim plate can be removed from the first plurality and added to the second plurality. This arrangement of components provides a convenient storage for shim plates needed for adjustment.

6 Claims, 2 Drawing Sheets

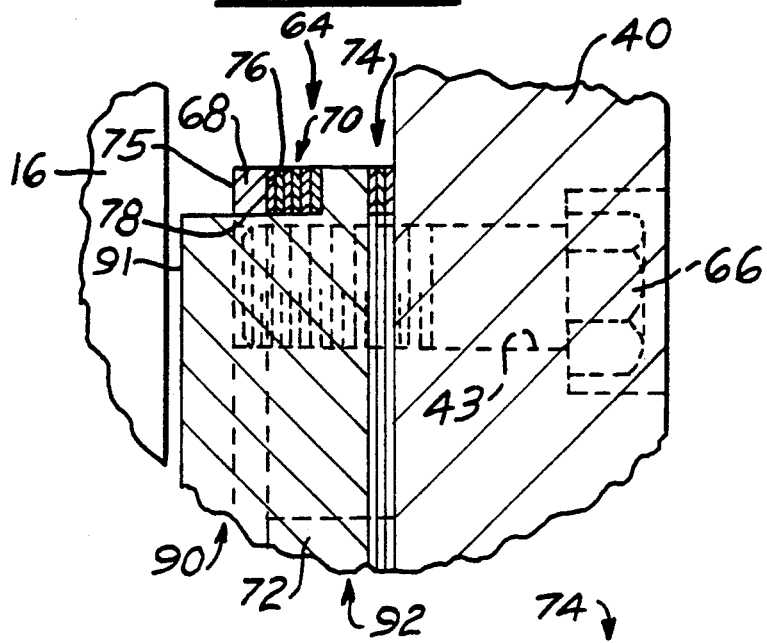
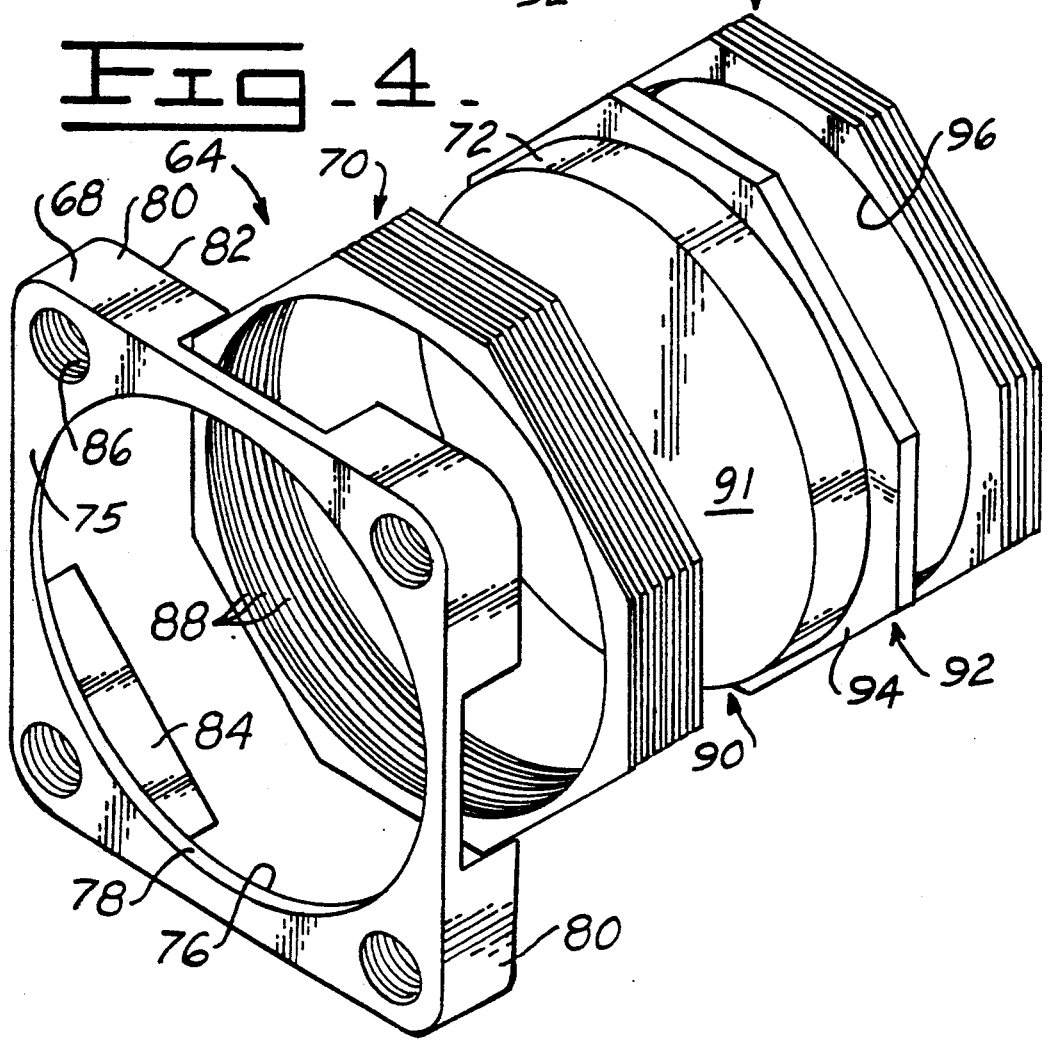

SELF-CONTAINED SHIM PACK ASSEMBLY

1. Technical Field

This invention relates generally to a impact ripper and more particularly to a shim pack assembly and guide arrangement to compensate for wear.

2. Background Art

Shim packs are commonly used to adjustably position a structure relative to another structure. An example of such use involves positioning a surface of a wear pad in close proximity to a pivotal shank to prevent twisting of the shank relative to the pivot pin. When the pad wears and the clearance between the pad and the shank increases a shim plate must be added behind the pad to adjust the pad relative to the shank. A problem associated with such a positioning assembly is that the shim plates which need to be added are usually maintained in a tool box or service area, away from the vehicle, and can be easily lost or misplaced and not readily available when adjustment is needed.

The present invention is directed to overcome the problem as set forth above.

DISCLOSURE OF THE INVENTION

In one aspect of the present invention, a self-contained shim pack arrangement is adapted to be mounted to a structure and includes a housing. A plunger has a first portion extending from the housing and a second portion within the housing and having an enlarged flange. A first plurality of shim plates within the housing is sandwiched between the flange and the housing. A second plurality of shim plates within the housing is sandwiched between the flange and the mounting structure. Means are provided for removably attaching the housing to the mounting structure.

The present invention provides a self-contained shim pack and guide arrangement for convenient adjustment of the guide relative to a moveable shank. The arrangement includes a plunger positioned within a housing and a first plurality of shim plates positioned within the housing on one side of the plunger and a second plurality of shim plates positioned within the housing on the other side of the plunger. When adjustment is needed, a shim plate can be removed from the first plurality and added to the second plurality.

BRIEF DESCRIPTION OF THE DRAWINGS

FIG. 3 i an enlarged partial sectional view of one of the shim packs; and

FIG. 4 an exploded view of the shim pack of the present invention.

BEST MODE FOR CARRYING OUT THE INVENTION

Figure 1:
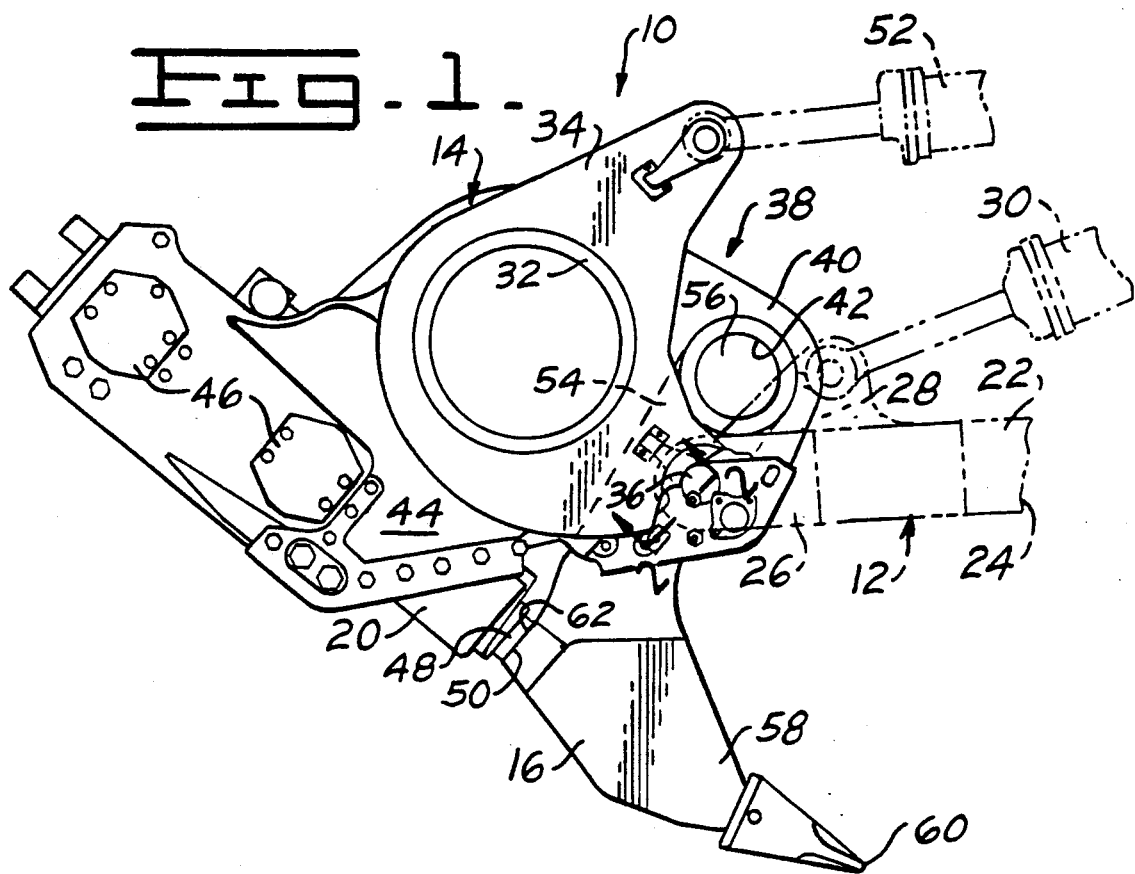
FIG. 1 is a side view of an impact ripper disclosing the present invention.

Referring to FIG. 1, an impact ripper 10 is shown in association with a support structure 12 and includes a mounting frame 14, a shank 16, and an impact hammer 20.

The support structure 12 includes a support frame 22. The support frame has a first end portion 24 attached to a vehicle (not shown). The support frame 22 includes a pair of rearwardly projecting transversely spaced legs 26 defining a second end portion 28 thereof. A pair of hydraulic cylinders 30 extend between the vehicle and the second end portion 28 of the support frame 22 to elevationally position the support frame 22.

The mounting frame 14 includes a crossbeam 32 and a pair of end support structures 34 mounted on laterally spaced opposite ends of the crossbeam 32 and being pivotally attached by a pair of pins 36 to the second end portion 28 of the support frame 22. The mounting frame 14 further includes a first support structure 38 having spaced support plates 40. The spaced support plates 40 have a pair of aligned holes 42 and a plurality of bolt holes 43. A pair of spaced apart second support plates 44 are mounted on the mounting frame 14, one on each side of the first support structure 38. The impact hammer 20 is mounted between the spaced second support plates 44 of the mounting frame 14 by a plurality of mounting assemblies 46. The impact hammer 20 includes a piston 48 having an impact surface 50. A pair of hydraulic cylinders 52 are positioned between each of the end support structures 34 and the vehicle (not shown) to pivot the mounting frame 14 about the pins 36.

The shank 16 has a first end portion 54 pivotally attached between the spaced support plates 40 of the first support structure 38 by a pin 56 positioned within the aligned holes 42, and a second end portion 58 projecting downwardly from the mounting frame 14. The second end portion 58 has a material engaging tip 60 and an impact surface 62.

Figure 2:
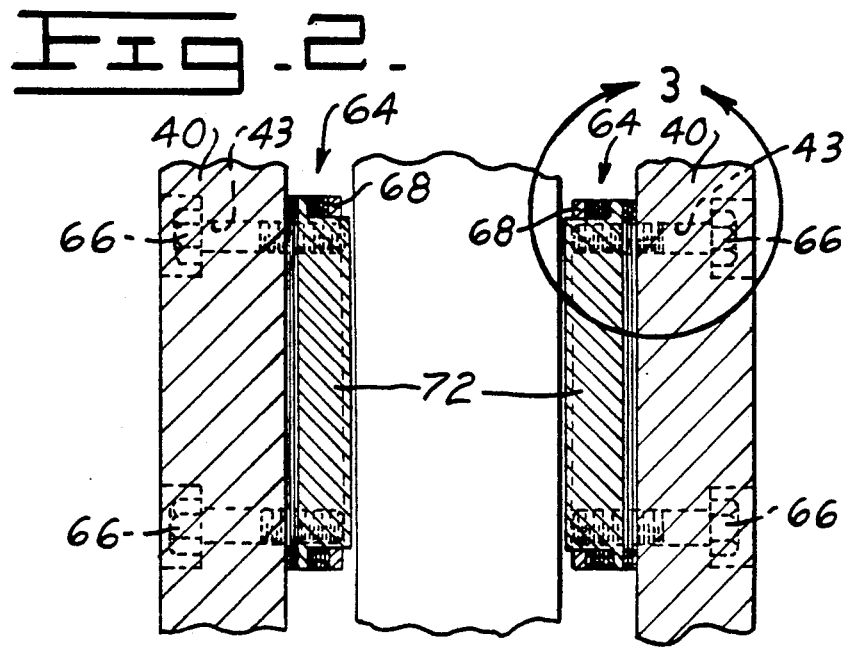
FIG. 2 is a sectional view of a pair of shim packs taken a 2—2 in FIG. 1.

Now referring to FIGS. 2-4, a shim pack assembly 64 is positioned between the shank 16 and each of the spaced support plates 40 and is removably attached to each of the spaced support plates 40 by a plurality of fastening means, such as bolts 66. The shim pack assembly 64 includes a housing 68, a first plurality of shim plates 70, a plunger 72, and a second plurality of shim plates 74. The housing 68 has a reference surface 75, a shim engagement surface 76 and a central hole 78 therebetween. A plurality of fingers 80 project from the housing 68 opposite the reference surface 75 and each has a second surface 82. Each of the fingers 80 has an angular surface 84. A plurality of threaded holes 86, one in each of the fingers 80, extending from the reference surface 75 to the second surface 82. Each shim plate of the first plurality of shim plates 70 has an outer octagon shape which conforms to the angular surfaces 84 of the housing 68 to prevent rotation of the shim plates 70. The shim plates 70 each have a central hole 88. The plunger 72 has an annular first portion 90 which extends through the hole 88 of the shim plates 70, the hole 78 of the housing 68, and extends a predetermined distance from the housing 68 beyond the reference surface 75. The first portion 90 has a wear surface 91. The plunger 72 has a second portion 92 within the housing 68, having an enlarged flange 94 having an outer octagon shape which conforms to the angular surfaces 84 of the housing 68 to to prevent rotation and interacts with the first and second pluralities of shim plates 70. Each shim plate of the second plurality of shim plates 74 has an outer octagon shape which conforms to the angular surfaces 84 of the housing 68 to prevent rotation of the shim plates 74. Each shim plate of the plurality of shim plates 74 has a central hole 96. The second plurality of shim plates 74 is sandwiched between the annular flange 94 of the plunger 72 and one of the spaced support plates 40. The shim pack assembly 64 is removably secured to the support plate 40 by the plurality of bolts 66 passing through the bolt holes 43 and threadable engaging the threaded holes 86 in the housing 68.

Industrial Applicability

In the use of the present invention a shim pack assembly 64 is positioned between the shank 16 and each of the spaced support plates 40 to guide and prevent twisting of the shank 16. The first plurality of shim plates 70 is inserted into the housing 68 until they contact the shim engagement surface 76 and the angular surfaces of the shim plates 70 interacting with the angular surfaces 84 of the housing 68 to prevent rotation of the shim plates 70. The plunger 72 is inserted through the hole 88 in the shim plates 70 and the hole 78 in the housing 68 until the flange 94 contacts the shim plates 70, thus positioning the wear surface 91 the predetermined distance beyond the reference surface 75 of the housing. The angular surfaces of the plunger interact with the angular surfaces 84 of the housing. The second plurality of shim plates 74 is inserted into the housing 68 and contact the annular flange 94. The angular surfaces of the shim plates 74 interact with the angular surfaces 84 of the housing 68 to prevent rotation of the shim plates 74. The shim pack assembly 64 is removably attached to the spaced support plate 40 by a plurality of bolts 66. When the extending portion 90 of the plunger 72 wears away adjustment is needed to maintain the proper relationship between the wear surface 91 and the shank 16. To reposition the wear surface 91 to the proper relationship, the bolts 66 must be removed from the housing 68 and the housing removed from between the shank 16 and the support plate 40. One or more of the plates of the first plurality 70 must be removed and added to the second plurality 74 to again position the wear surface 91 the predetermined distance beyond the reference surface 75 of the housing 68 and in proper relationship to the shank 16. The bolts are threadably engaged in the threaded holes to attach the shim pack assembly 64 to the support plate 40.

In view of the foregoing, it is readily apparent that the structure of the present invention provides a simple and convenient way to adjust the position of the plunger with respect to the shank. With the shim plates being maintained in the housing, the shim plates are conveniently stored until adjustment is needed.

Other aspects, objects, and advantages of this invention can be obtained from a study of the drawings, the disclosure, and the appended claims.

I claim:

1. A self-contained shim pack assembly adapted to be attached to a mounting structure to guide a moveable member, comprising:
    a housing having a reference surface, a shim engagement surface and a central hole therebetween;
    a plunger having a first portion with a wear surface extending through the central hole of the housing a predetermined distance beyond the reference surface and a second portion within the housing having an enlarged flange;
    a first plurality of shim plates within the housing sandwiched between the flange of the plunger and the shim engagement surface of the housing;
    a second plurality of shim plates sandwiched between the flange of the plunger and the mounting structure; and means for removably attaching the housing to the mounting structure so that as the extending portion wears and adjustment is needed a shim plate can be removed from the first plurality and added to the second plurality to again position the wear surface the predetermined distance beyond the reference surface.

2. The self-contained shim pack of claim 1 wherein the housing has a plurality of fingers projecting toward the mounting structure.

3. The self-contained shim pack of claim 2 wherein each of the fingers has a tangental angular surface.

4. The self-contained shim pack of claim 3 wherein the enlarged flange of the plunger has an outer octagon shape which interacts with the tangental angular surfaces of the fingers.

5. The self-contained shim pack of claim 4 wherein the first and second plurality of shim plates have an outer octagon shape, which interacts with the tangental angular surface of the fingers, and a central hole.

6. An impact ripper apparatus having a shim assembly adapted to be attached to a mounting structure to guide a moveable shank, comprising;
    a housing having a reference surface, a shim engagement surface and a central hole therebetween, the housing further includes a plurality of fingers projecting toward the mounting structure, each of the fingers having a tangental angular surface;
    a first plurality of shim plates positioned within the housing adjacent the shim engagement surface, each of the shim plates has an outer octagon shape interacting with the angular surfaces of the fingers and have a central hole;
    a plunger positioned within the housing adjacent the first plurality of shim plates and having a first portion extending through the central holes of the first shim plates and the central hole of the housing a predetermined distance beyond the reference surface, a second portion within the housing has an enlarged flange having an outer octagon shape which interacts with the angular surfaces of the fingers; and
    a second plurality of shim plates positioned within the housing adjacent the flange of the plunger opposite the first plurality of shim plates, each of the shim plates has an outer octagon shape which interacts with the angular surfaces of the fingers.

* * * * *